(12) United States Patent
Kirby

(10) Patent No.: US 6,942,539 B1
(45) Date of Patent: Sep. 13, 2005

(54) SOUND QUALITY BOX CALL

(76) Inventor: Richard C. Kirby, 6426 W. Quaker Rd., Orchard Park, NY (US) 14127

( * ) Notice: Subject to any disclaimer, the term of this patent is extended or adjusted under 35 U.S.C. 154(b) by 0 days.

(21) Appl. No.: 10/788,882

(22) Filed: Feb. 27, 2004

Related U.S. Application Data

(63) Continuation-in-part of application No. 10/768,876, filed on Jan. 30, 2004, now abandoned.

(51) Int. Cl.[7] .............................................. A63H 5/00
(52) U.S. Cl. ....................................... 446/397; 446/418
(58) Field of Search ............................ 446/397, 418, 446/421, 422, 176, 180; 84/402, 410, 408

(56) References Cited

U.S. PATENT DOCUMENTS

| | | | | |
|---|---|---|---|---|
| 4,846,753 A | * | 7/1989 | Langston | 446/397 |
| 4,932,920 A | * | 6/1990 | Hearn | 446/397 |
| 4,941,858 A | * | 7/1990 | Adams | 446/397 |
| 5,380,235 A | * | 1/1995 | Forbes et al. | 446/397 |
| 5,484,319 A | * | 1/1996 | Battey | 446/397 |
| 5,830,036 A | * | 11/1998 | Richardson | 446/397 |
| 6,168,493 B1 | * | 1/2001 | Kirby | 446/418 |

* cited by examiner

Primary Examiner—Bena Miller
(74) Attorney, Agent, or Firm—James C. Simmons

(57) ABSTRACT

An improved sound quality box call. The box call comprises a box and a paddle. The box has a pair of longitudinal walls, a sounding chamber between the walls, and a pair of longitudinally extending upper arcuate edges on the walls respectively. The paddle has a lower surface for engaging the edges for making sounds. The paddle lower surface is longitudinally arcuate and has a contour longitudinally which desirably conforms substantially to the contour longitudinally of the arcuate side wall edges, which allows increased length of contact between the paddle and box side walls whereby to produce a more realistic yelp and better sound quality in both pitch and volume.

14 Claims, 1 Drawing Sheet

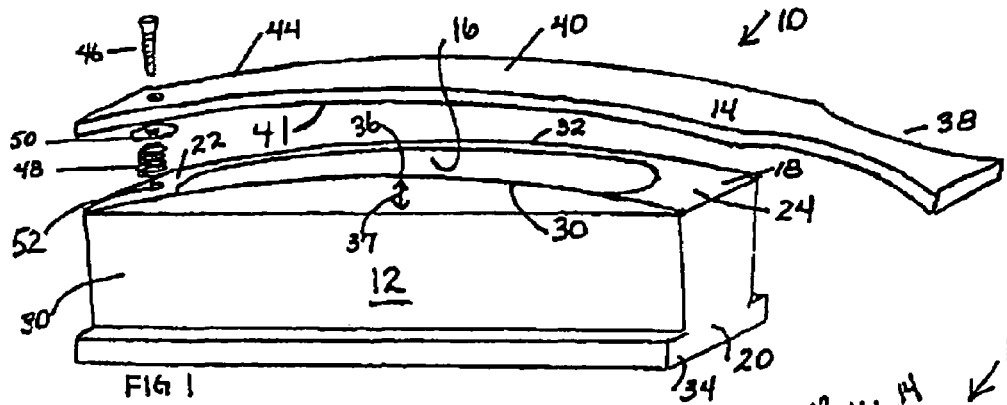
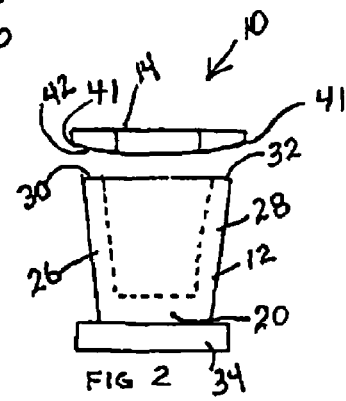
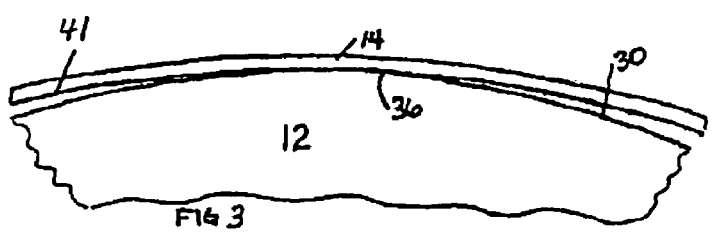
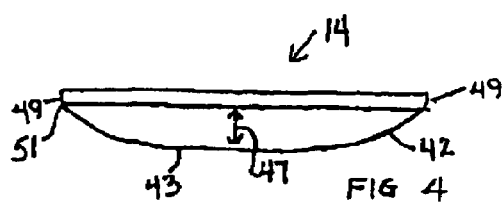
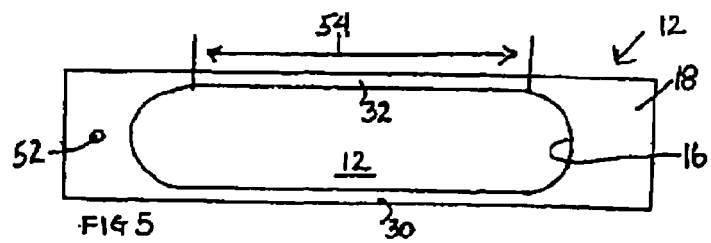

SOUND QUALITY BOX CALL

This is a continuation-in-part of U.S. patent application Ser. No. 10/768,876, filed Jan. 30, 2004, now abandoned the disclosure of which is incorporated herein by reference.

The present invention relates generally to wild game calls. More particularly, the present invention relates to a type of call commonly known as a box call.

A box call is shown in applicant's U.S. Pat. No. 6,168,493, the disclosure of which is incorporated herein by reference. As shown therein, a box call, typically composed of wood, comprises a hollowed out block (box) defining a trough or sounding chamber in its upper surface and thin side walls which define upper edges adjacent the trough. The upper surface of the block, including the edges, is bowed from end to end (longitudinally) to have a convex arcuate shape longitudinally. A paddle or striker member is attached by a screw and spring at one end to an end portion of the block and overlies the trough, and the other end is in the shape of a handle for manipulation of the paddle by a person making the sound of wild game. The paddle lower surface is bowed to have a convex arcuate shape from side to side (laterally or width-wise) thereby to present a rounded surface to the block side wall edges for producing wild game sounds. The paddle lower surface, though bowed laterally, is flat (not arcuate) longitudinally (i.e., in a direction from end to end). The purpose of the bowed upper box surface, as I described in my aforesaid patent, is to thereby present only a small intermediate portion longitudinally of each edge to the paddle for making a sound. Although the box call of my aforesaid patent is one which has an adjustment mechanism for adjusting the paddle to different positions and the present invention is applicable thereto, it should be understood that the present invention is also applicable to other box calls including box calls which do not have such an adjustment feature.

It is an object of the present invention to improve the quality of sound produced by a box call.

In order to improve the quality of sound produced by a box call, in accordance with the present invention, the paddle lower surface is longitudinally arcuate so as to achieve contact, at any given time during use, over a greater intermediate distance longitudinally with longitudinally arcuate box edges. In accordance with a preferred embodiment of the present invention, the paddle lower surface and the side wall edges have substantially the same contour longitudinally.

The above and other objects, features, and advantages of the present invention will be apparent in the following detailed description of the preferred embodiment thereof when read in conjunction with the accompanying drawings wherein the same reference numerals denote the same or similar parts throughout the several views.

BRIEF DESCRIPTION OF THE DRAWINGS

FIG. 1 is an exploded view of a box call which embodies the present invention.

FIG. 2 is an end view (handle end) thereof.

FIG. 3 is a schematic partial side view thereof illustrating the contours longitudinally of the paddle lower surface and the side wall edges.

FIG. 4 is an enlarged end view (end opposite the handle) of the lid or paddle for the call.

FIG. 5 is a plan view of the upper surface of the call box of the call of FIG. 1.

DETAILED DESCRIPTION OF THE PREFERRED EMBODIMENT

Referring to FIGS. 1 and 2, there is shown generally at 10 a box call composed of wood or other suitable material and which includes a block or box 12 and a paddle or striker plate 14.

The hand-held call box 12 is formed to be hollowed out to define a trough or sounding chamber, illustrated at 16 in FIG. 1, centrally in its upper surface 18. The box 12 is shaped to define a thick bottom wall 20, thick forward and aft end walls 22 and 24 respectively, and thin elongate side walls 26 and 28 terminating in thin upper edges 30 and 32 respectively. Although not necessarily required, the side walls may be reinforced by longitudinal ribs (not shown, but shown in the aforementioned patent) one of which defines the upper edge in each side. The bottom wall preferably has an optional enlarged width or foot 34 to afford stability when the call is laid down.

The upper surface 18 of the call box 12, including the edges 30 and 32, is, like the box call in my aforementioned patent, bowed longitudinally (from end to end or in a direction length-wise thereof) to have a arcuate convex shape (i.e., the highest point, illustrated at 36, of each of the edges 30 and 32 is at or near the center longitudinally of the box 12). The amount of curvature will vary depending on the quality of the yelp sound to be produced, but not so much that binding of the paddle 14 therewith occurs.

The paddle or striker member 14 is an elongate thin member having a length and width to fit over or overlie the upper surface 18 of the box 12, and its aft end portion 38 extends rearwardly beyond the rear end of the box 12 and has a reduced width which is suitably shaped to define a handle. The paddle upper surface 40 is generally flat laterally (from side to side).

The forward end portion 44 of the paddle 14 is attached to the forward wall 30 of the box 14 by means of a screw 46 received in an aperture (not shown) in the paddle and threadedly received in a threaded aperture, illustrated at 52, in the box upper surface 18, and an optional spring 48, with optional washer 50, is received on the screw between the box 12 and paddle 14 to allow the paddle 14 to springedly pivot about the screw shank for effecting movement of the paddle cross-wise of the edges 30 and 32 for producing the sounds. When the call is not being used, the handle 38 may be suitably secured against such pivotal movement by suitable means such as an elastic band (not shown) attached to the lower part of the aft wall by a screw or other suitable means wherein the band is sized to stretch tautly over the handle, as shown in my aforementioned patent. The paddle may of course be attached to the box by other suitable means.

The lower surface 42 of the paddle 14 is bowed, as illustrated in FIG. 4, to have an arcuate convex shape laterally or width-wise thereof to thereby present a rounded surface to the edges 30 and 32. A suitable chalk or the like may be applied to the edges and the paddle lower surface to improve friction between the rubbing surfaces to aid in the production of high quality sound. The high part (laterally central part which is the thickest) of the paddle 14 engages one of the edges 30 and 32 and rides downwardly into the trough to create sound. The paddle lateral arc will vary according to wood thickness and wood types. The increased or decreased rigidity due to greater or lesser weight and/or thickness will produce a varied pitch.

In my aforementioned patent, the lower surface of the paddle is shown to be flat or non-arcuate longitudinally, in accordance with what has been conventional practice in the trade. The relation between the longitudinally flat lower paddle surface and the longitudinally arcuate box upper surface, including the edges, resulted in the box presenting only a small intermediate portion longitudinally of each edge to the paddle (laterally center thereof) for making a sound, and this relationship produces good quality sounds. However, I tried substantially conforming the contour longitudinally of the paddle lower surface 42 to the contour longitudinally of the box edges 30 and 32 (i.e., the contour of the longitudinally extending box edges 30 and 32) and was surprised to find that this permitted an even higher quality sound to be produced and more easily so that inexperienced callers could more easily learn to use the call. Accordingly, in accordance with the present invention, the paddle lower surface 42 is longitudinally arcuate (i.e., its longitudinally extending edges 41 are arcuate, as seen in FIGS. 1 and 3, thus defining or defined by the paddle lower surface as being arcuate in the longitudinal direction or direction parallel to the edges 41) so as to achieve contact over a greater intermediate distance longitudinally with the longitudinally arcuate box edges 30 and 32. Preferably, the paddle lower surface 42 and the side wall edges 30 and 32 have substantially the same complementary contour or curvature longitudinally, as illustrated in FIG. 3, i.e., the curvatures or contours of the longitudinally extending paddle lower surface edges 41 respectively conforming substantially to the curvatures or contours of the longitudinally extending side wall edges respectively. It should of course be understood that the handle 38 need not have such a curved lower surface and that the upper surface of the paddle 14 need not be curved. Such a substantial conformance of curvatures is provided to desirably allow contact, at any given time during use, between the lower surface of the paddle and intermediate portions of the edges 30 and 32 over substantial portions of the entire lengths thereof, i.e., over at least about 50 percent of the edge length, illustrated at 54 in FIG. 5, the edge length being the length of a portion of the box upper surface 18 along the trough 16 which is generally uniform in width.

Initially, it was believed, as discussed in the parent application, that the paddle curvature must be less acute (have a slightly greater radius of curvature), as illustrated in FIG. 3, than that of the box edges. However, after the parent application was filed, I discovered that the call may still work satisfactorily if the paddle curvature is more acute than that of the box edges. Thus, in accordance with the present invention, the paddle lower surface longitudinal contour may be more or less acute than the longitudinal contour of the box edges 30 and 32.

While it may be desirable, it is not necessary to the present invention that the paddle lower surface contour be a consistent arc. For example, the radius of curvature may change over the length of the arc, or the contour may have flat spots.

If the bottom lateral arc 42 on the paddle is too steep, binding may undesirably occur. However, if the arc 42 is too flat, the paddle may merely slide (insufficient friction) with the result that it may be difficult to produce the desired yelp sound. Thus, the arc 42 is desirably such as to produce a friction point but does not cause binding. In FIG. 4, the measurement of the arc 42 is with reference to the rise, illustrated at 47, over the width of the paddle. Since the paddle may (but need not have) have squared upper sides, illustrated at 49, which may, for example, have a height of about 1/16 inch, the rise 47 begins at the point, illustrated at 51, where a squared side 49 ends and the arc 42 begins. Desirably, the rise 47 may be slightly less than the corresponding rise for the conventional box call paddle. For example, whereas the arc of a conventional box call paddle may have a rise of typically about 3/16 to 1/4 inch over the typical paddle width of about 1¾ inch for use with a box having a length of about 7½ inch and a rise of about 3/8 inch, a rise 47 over the same paddle width for the same box dimensions for the paddle of the present invention may, for example, be about 1/8 to 3/16 inch, i.e., about 1/16 less rise, for example, a rise of about 1/8 inch.

In order to better achieve a good friction point without binding for high quality sounds, in accordance with a preferred embodiment of the present invention, the lateral arc 42 on the paddle 14 is truncated centrally thereof, i.e., it comprises rounded portions adjacent the paddle sides and a flatter (or even flat) central portion, illustrated at 43.

The box upper edge curvature is such as to provide a rise, illustrated at 37, of up to about ½ inch centrally of the box length (at the highest point 36), preferably ¼ inch or less. In addition to the bottom lateral arc on the paddle being flattened to a lesser arc than is typical, the top edges of the box side walls may be flattened out more longitudinally to prevent binding, more easily allowing the paddle to engage or ride the increased box side wall length as provided by the longitudinal paddle curvature as discussed above, thereby creating a longer highly desired yelp with added rasp for luring wild turkeys into close range. Since the tendency to bind is greater when there are steep curvatures at increased box lengths, the curvature or amount of rise is reduced at greater box lengths. The rise 37 may be, for example, about ¼ inch for a box length of about 7½ inches and about 3/16 inch for a box length of about 10 inches.

The following example is for exemplary purposes only and not for purposes of limitation. For example, for a box length of 7½ inches, the overall length of the trough 16 may be about 5¼ inches, and the edges 30 and 32 may each have a length 54 of about 4¼ inches and a width which varies between about 1/16 and 1/8 inch. The box upper surface 18 may, for example, rise a distance 37 as indicated above, and the paddle lower surface 42 may curve longitudinally at a slightly smaller radius (for example, a rise of about 0.01 or 0.02 inch less than rise 37) which substantially conforms to the box upper surface curvature and which allows contact with the edges 30 and 32 over a distance of at least 50 percent of edge length 54. The paddle may, at any given time during use, contact the edges 30 and 32 over a distance of, for example, about 3 inches, which is more than 50 percent of the edge length 54.

The box 12 may be machined or otherwise suitably formed as is conventionally known in the art. If the paddle 14 is made of cedar, which is soft and will bend, it may be suitably machined to the desired shape, then soaked and placed in a press to achieve the desired longitudinal curvature. If the paddle is made of cherry or popular, which are harder and provide the higher pitch of a young turkey, a flat strip of material may be machined or otherwise suitably formed, then machined to cut the desired longitudinal curvature therein, then cut into individual pieces which are then machined into the paddles. By "machined," as used herein, is meant CNC-machining or other suitable machining. The paddle 14 as well as the box 12 may alternatively be formed of other suitable material and otherwise suitable formed. For example, the paddle as well as the box may be suitably injection molded from plastic and a wood strip veneer attached.

Box calls of more than one length (typically 7½ inch and 10 inches) may be produced to satisfy different hunters with different personal preferences. Normally, shorter boxes have steeper longitudinal curvatures and will be crisper and have shorter yelps, whereas longer boxes have flatter longitudinal curvatures and will have elongated yelps with added rasp. The longitudinal box curvature is selected to be what is appropriate for the box length, i.e., which results in a good quality sound and which does not result in binding, as discussed above. The paddle longitudinal curvature is then selected, as discussed above, to substantially conform to the box longitudinal curvature. Then, a paddle lateral curvature is selected, as discussed above, which provides a good friction point for producing a good quality sound and which does not result in binding.

When I first tried a call in accordance with the present invention, I was quite pleasantly surprised at the dramatically different sound which was produced. The length of the yelp was longer. Without the pitch changing, a higher quality of rasp (an intense sound component which the gobbler is looking for) was produced. I also discovered that the call of the present invention had the ability to make a cutting sound more easily and effectively, a cutting sound being the excited cuts or short snappy clucks that are of a broken rhythm and vary in pitch from very high to deep. Since the length of contact between the paddle and the box side walls is, at any given time during use, much greater than that of a conventional call due to the closeness over a longer distance of their arcs, the call of the present invention thus enables a more realistic yelp and better sound quality in both pitch and volume and provides a greater opportunity for a variety of tone or pitch changes. It is also easier and with less practice for the beginning caller to use the call and more difficult for the beginning caller to make a mistake.

It should be understood that, while the present invention has been described in detail herein, the invention can be embodied otherwise without departing from the principles thereof, and such other embodiments are meant to come within the scope of the present invention as defined by the appended claims.

What is claimed is:

1. A box call comprising an elongate box having a pair of longitudinally extending walls, a sounding chamber between said walls, a longitudinally extending upper arcuate edge on at least one of said walls, and an elongate paddle, said paddle having a lower surface for engaging said edge for making sounds, and said paddle lower surface having a pair of edges which extend longitudinally of said paddle and which are arcuate.

2. A box call according to claim 1 wherein said paddle lower surface has a centrally truncated lateral arc.

3. A box call according to claim 1 wherein said paddle has a width of about 1¾ inch, and said paddle lower surface is arcuate laterally and has an arc rise laterally of about ⅛ to 3/16 inch.

4. A box call according to claim 1 wherein said paddle has a width of about 1¾ inch, and said paddle lower surface is arcuate laterally and has an arc rise laterally of about ⅛ inch.

5. A box call according to claim 1 wherein said paddle is pivotly attached to an end portion of said box.

6. A box call comprising an elongate box having a pair of longitudinally extending walls, a sounding chamber between said walls, a longitudinally extending upper arcuate edge on at least one of said walls, and an elongate paddle, said paddle having a lower surface for engaging said edge for making sounds, said paddle lower surface having a pair of edges which extend longitudinally of said paddle and which are arcuate and each of which has a contour which conforms substantially to a contour of said at least arcuate side wall edge.

7. A box call according to claim 6 wherein said paddle lower surface has a centrally truncated lateral arc.

8. A box call according to claim 6 wherein said paddle has a width of about 1¾ inch, and said paddle lower surface is arcuate laterally and has an arc rise laterally of about ⅛ to 3/16 inch.

9. A box call according to claim 6 wherein said paddle has a width of about 1¾ inch, and said paddle lower surface is arcuate laterally and has an arc rise laterally of about ⅛ inch.

10. A box call according to claim 6 wherein said paddle is pivotly attached to an end portion of said box.

11. A box call comprising an elongate box having a pair of longitudinally extending walls, a sounding chamber between said walls, a pair of longitudinally extending upper arcuate edges on said walls respectively, and an elongate paddle, said box having an arc rise of about 3/16 to ¼ inch, said paddle having a lower surface for engaging said edges for making sounds, said paddle lower surface having a pair of edges extending longitudinally of said paddle and which have contours respectively which conform substantially to the contours of said arcuate side wall edges respectively, said paddle has a width of about 1¾ inch, and said paddle lower surface is arcuate laterally and has an arc rise laterally of about ⅛ to 3/16 inch.

12. A box call according to claim 11 wherein said paddle lower surface has a centrally truncated lateral arc.

13. A box call according to claim 11 wherein said paddle arc rise laterally is about ⅛ inch.

14. A box call according to claim 11 wherein said paddle is pivotly attached to an end portion of said box.

* * * * *

UNITED STATES PATENT AND TRADEMARK OFFICE
CERTIFICATE OF CORRECTION

PATENT NO. : 6,942,539 B1  Page 1 of 1
DATED : September 13, 2005
INVENTOR(S) : Richard C. Kirby It is certified that error appears in the above-identified patent and that said Letters Patent is hereby corrected as shown below:

Column 6,
Line 16, "at least" should be deleted.
Line 38, "the" should be deleted.

Signed and Sealed this

Twenty-first Day of March, 2006

JON W. DUDAS
*Director of the United States Patent and Trademark Office*